US009731305B2

(12) United States Patent
Al-Ansary et al.

(10) Patent No.: US 9,731,305 B2
(45) Date of Patent: Aug. 15, 2017

(54) NOZZLE APPARATUS AND METHOD

(71) Applicant: King Saud University, Riyadh (SA)

(72) Inventors: Hany A. Al-Ansary, Riyadh (SA); Kevin G. Schoonover, Atlanta, GA (US); Said I. Abdel-Khalik, Tucker, GA (US)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 15/148,467

(22) Filed: May 6, 2016

(65) Prior Publication Data

US 2016/0250652 A1 Sep. 1, 2016

Related U.S. Application Data

(60) Division of application No. 14/277,817, filed on May 15, 2014, which is a continuation of application No. PCT/US2011/061741, filed on Nov. 21, 2011.

(51) Int. Cl.

| | |
|---|---|
| ***A01G 25/09*** | (2006.01) |
| ***B05B 17/00*** | (2006.01) |
| ***B05B 1/34*** | (2006.01) |
| ***B05B 1/14*** | (2006.01) |
| *F22G 5/12* | (2006.01) |

(52) U.S. Cl.

CPC .............. *B05B 1/3405* (2013.01); *B05B 1/14* (2013.01); *B05B 1/34* (2013.01); *F22G 5/123* (2013.01)

(58) Field of Classification Search

CPC B05B 1/3405; B05B 1/14; B05B 1/34; B05B 15/0431; B05B 3/1092; B05B 5/0426; B05B 7/066; B05B 7/0815; B05B 7/083; B05B 1/005; B05B 7/0075; F22G 5/123

USPC ... 239/1, 290, 291, 292, 437, 554, 550, 548, 239/549, 562, 436; 169/37–41

See application file for complete search history.

(56) References Cited

U.S. PATENT DOCUMENTS

| | | | | |
|---|---|---|---|---|
| 2,568,429 A * | 9/1951 | Burnam | ............... | A62C 35/605 169/38 |
| 7,028,994 B2 * | 4/2006 | Sherikar | .................. | B05B 1/06 122/487 |
| 2003/0197071 A1 | 10/2003 | Whittaker | | |

(Continued)

FOREIGN PATENT DOCUMENTS

WO 2011-128433 A1 10/2011

OTHER PUBLICATIONS

International Search Report dated May 16, 2012 issued in International Appln. No. PCT/US2011/061741, 3 pp.

*Primary Examiner* — Justin Jonaitis
(74) *Attorney, Agent, or Firm* — Hauptman Ham, LLP

(57) ABSTRACT

The present disclosure introduces a nozzle apparatus and method. In one embodiment, a spray nozzle apparatus is described. The spray nozzle apparatus includes a plurality of flow channels formed by the combination of a: sprayhead, a major element, and a minor element. The sprayhead may have a plurality of holes. The major element is retained within the sprayhead by a nozzle nut and spring, allowing a first annular gap to form between the sprayhead and the major element. The minor element is retained within the major element by a second nozzle nut and second spring, allowing a second annular gap to form between the major element and the minor element. The minor element may have an axial hole. Other embodiments also are described.

5 Claims, 3 Drawing Sheets

(56) References Cited

U.S. PATENT DOCUMENTS

| | | | |
|---|---|---|---|
| 2003/0230641 A1 | 12/2003 | Foster et al. | |
| 2004/0000602 A1 | 1/2004 | Peterson | |
| 2014/0252125 A1* | 9/2014 | Mastrovito | B05B 1/14 239/302 |

* cited by examiner

NOZZLE APPARATUS AND METHOD

CROSS REFERENCE TO RELATED APPLICATIONS

The present application is a Divisional of U.S. patent application Ser. No. 14/277,817, filed May 15, 2015, which is a continuation of PCT/US11/61741, Nov. 21, 2011, the disclosures of which are incorporated herein by reference in their entirety.

BACKGROUND

Spray nozzles of various configurations have long been the choice of utility engineers to control fluid distribution as well as the temperature of a fluid such as steam. Early spray nozzle designs were very simple and some actually had no moving parts. However, in the last twenty-five (25) years, the design and technology of the standard spray nozzle has changed to meet the changing needs and operating modes of today's modern power plants and engineering facilities.

SUMMARY

The present disclosure introduces a nozzle apparatus and method. In one embodiment, a spray nozzle apparatus is described. The spray nozzle apparatus includes a plurality of flow channels formed by the combination of a: sprayhead, a major element, and a minor element. The sprayhead may have a plurality of holes. The major element is retained within the sprayhead by a nozzle nut and spring, allowing a first annular gap to form between the sprayhead and the major element. The minor element is retained within the major element by a second nozzle nut and second spring, allowing a second annular gap to form between the major element and the minor element. The minor element may have an axial hole. Other embodiments also are described.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features. The figures discussed herein are not necessarily drawn to scale. Some dimensions may be changed to better illustrate specific details or relationships.

DETAILED DESCRIPTION

Figure 1:
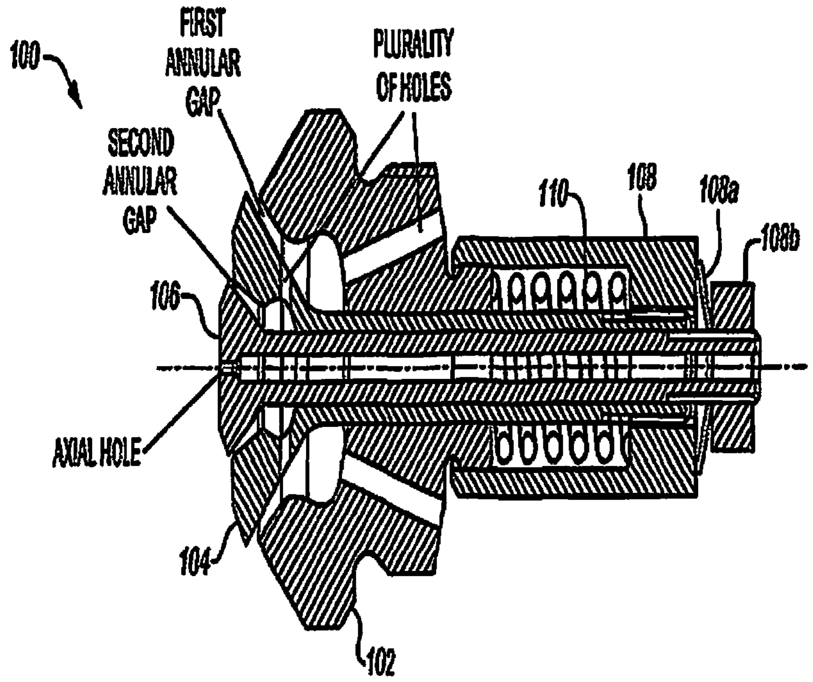
FIG. 1 is an exploded view of a spray nozzle apparatus, according to an example embodiment.

The following detailed description is divided into several sections. A first section presents an overview. A next section provides a description of an exemplary nozzle apparatus and its components. A third section presents an exemplary method of using a nozzle apparatus. The final section presents the claims.

Overview

The spray nozzle apparatus described herein provides three distinct flow channels that may be optimized for particle size and spatial distribution. Many factors need to be considered when designing a spray nozzle; the most important factors are: (1) droplet particle size, (2) spatial particle distribution, (3) spray performance turndown, and (4) spray particle exit velocity and angle. The three-element variable spray nozzle apparatus (henceforth the "Triple Nozzle") optimizes these four variables within a single assembly. It is the equivalent of having three nozzles of different dimensions and characteristics combined into one nozzle. By using flow conditioning and careful dimensioning of the three elements, the Triple Nozzle apparatus produces a consistent and homogenous spray pattern and particle distribution at high rangeability levels, over wide ranges of spray flow rates (and supply differential pressures).

Droplet Particle Size and Spatial Particle Distribution of the Triple Nozzle

Spray droplet size is a function of the sheet thickness at the nozzle exit. In current (single element) backpressure activated nozzle designs, the flow is extruded through a single annular gap. To increase the nozzle flow capacity, the width of the annular gap has to be increased. However, with increasing annular gap width, the resultant fluid sheet becomes thicker; and as it breaks down (to form the spray), the associated droplets become larger in diameter and not well distributed. Droplet size is a key parameter in the effectiveness of heat transfer between superheated steam to be conditioned and subcooled liquid spray. A field of smaller droplets will have considerably more interfacial surface area for heat transfer than will the same mass when distributed in larger drop diameters. The Triple Nozzle apparatus handles this requirement by providing three flow channels capable of optimization. The annular width and injection angle for each of the three spray paths may be optimized to achieve a desired particle size as well as a better distribution of droplet placement in the flow stream over a wide range of flow rates.

Spray Performance Turndown of the Triple Nozzle

Spray performance turndown is another important consideration, since it directly impacts the range over which the fluid temperature (including steam temperature) can be controlled. By definition, turndown is the ratio of the minimum to maximum controllable flow of the nozzle. The term "rangeability" is sometimes used interchangeably with the term "turndown." In a single element nozzle, the turndown is more a function of the pressure differential across the nozzle, since the control element stroke is small. As a result, the turndown can be less than desirable, especially at minimum flow conditions. In the Triple Nozzle design, three concentric control surfaces work together to achieve a wider range of flow turndown while at the same time assuring that the particle size and flow distribution is consistent at all flow conditions.

Spray Particle Velocity and Injection Angle of the Triple Nozzle

An additional consideration of the Triple Nozzle design is the spray particle velocity and injection angle. In current single-element nozzle arrangements, only one control surface handles both of these. The spray angle is constant at all flow rates, and the spray injection velocity is purely a function of the mass flow rate through the single annulus. If the angle is too large or the spray velocity is too high, the particles will strike the surrounding pipe walls causing thermal shock and destroying the homogeneity of the spray distribution. If the spray angle is too shallow or the spray velocity is too low, the spray pattern will collapse, coalesce, and once again fall out of the flow stream with minimum vaporization. In the Triple Nozzle design, the three-element sprayhead allows for spray angles to be configured to match conditions in the steam flow, whether at high velocity maximum flow rates or at low velocity minimums.

An Exemplary Nozzle Apparatus

FIG. 1 shows an exemplary Triple Nozzle apparatus 100, according to one embodiment. The triple nozzle apparatus 100 may include a plurality of flow channels formed by the following components: a sprayhead 102, a major element 104 retained within the sprayhead 102, and a minor element 106 retained within the major element 104. This combination of elements provides the Triple Nozzle apparatus 100 with three distinct flow channels that may be optimized for particle size and spatial distribution.

The Triple Nozzle apparatus 100 may include a sprayhead 102. A sprayhead 102 may be any support member which holds one or more nozzles. The sprayhead 102 may be fabricated of any metal material. In one exemplary embodiment, the sprayhead 102 may be fabricated from stainless steel, due to its high temperature resistance. In an exemplary embodiment, the sprayhead 102 may have a plurality of holes. The plurality of holes within the sprayhead 102 may allow fluid to enter both the major element 104 and the minor element 106 retained in the major element 104. In one embodiment, the plurality of holes is drilled into the sprayhead 102. The plurality of holes may be drilled into the sprayhead 102 at an angle to impart swirl onto a fluid before exiting through a first annular gap formed between the sprayhead 102 and the major element 104, and/or a second annular gap formed between the major element 104 and the minor element 106. Furthermore, the sprayhead 102 may have a plurality of edges. In an exemplary embodiment, the plurality of edges of the sprayhead 102 may be sharp.

The Triple Nozzle apparatus 100 may further include a major element 104. The major element 104 may be retained within the sprayhead 102 by a nozzle nut 108 and spring 110. A nozzle nut 108 may be any hardware capable of being fastened to connect the major element 104 to the sprayhead 102. The spring 110 may be any elastic mechanical device used to store transferrable mechanical energy. In one example embodiment, the nozzle nut 108 may further comprise additional components used to secure the major element 104, such as an additional spring **108*a* and element nut 108*b*. Both the nozzle nut 108 (and its components) and the spring 110 may be fabricated from any metal material. In one exemplary embodiment, both the nozzle nut 108 and the spring 110** may be fabricated out of stainless steel.

An annular gap can form between the edges of the sprayhead 102 and the outer diameter of the major element 104. Fluid may exit the major element 104 through the annular gap. Fluid may be any substance that has no fixed shape and yields easily to external pressure. Example embodiments of fluid may include a gas (including steam) and liquid. In an exemplary embodiment, multiple fluids may pass through the plurality of flow channels. The width of the annular gap varies, depending on a spring constant of the retaining spring 110 and the fluid supply differential pressure (i.e., the mass flow rate through the annular gap). In one embodiment, steam may be one of the fluids passing through the plurality of flow channels. Liquid water may be another fluid passing through the plurality of flow channels. The spring constant of the spring 110 for the major element 104 may be selected based on a desired range of differential pressure between a fluid supply and the steam into which water is to be sprayed. The maximum travel of the major element 104 with respect to the sprayhead 102 (i.e., the maximum width of the annular gap) is to be determined based on a desired droplet size and flow rate for a given major element 104 diameter (i.e., nozzle size) and supply differential pressure. In an exemplary embodiment, the width of the annular gap may be adjustable.

Furthermore, the Triple Nozzle apparatus 100 may further include a minor element 106. The minor element 106 may be retained within the major element 104. The minor element 106 may be seated within the major element 104 allowing the major element 104 to serve as a sprayhead for the minor element 106. A nozzle nut 108 and a spring 110 (or spring washer) may serve to retain the minor element 106 within the major element 104. In one example embodiment, the nozzle nut 108 may further comprise additional components used to secure the minor element 106, such as an additional spring **108*a* and an element nut 108*b*. A second annular gap may form between an interior edge of the major element 104 and an outer sharp edge of the minor element 106. The width of the second annular gap may vary depending on the spring constant for the spring 110 (or spring washer) and the liquid supply differential pressure (i.e., the mass flow rate through the annular second gap). Before exiting through the second annular gap, fluid may enter the minor element 106 through multiple holes drilled within the major element 104. The holes may be drilled through the major element 104 at an angle to impart swirl onto the fluid before exiting through the second annular gap (gap between the inner edge of the major element 104 and the outer edge of the minor element 106). The maximum travel of the minor element 106 with respect to the major element 104 (i.e., the maximum width of the second annular gap) is to be determined based on a desired droplet size to be produced by the second annular gap and the flow rate for a given minor element 106** diameter (i.e., nozzle size) and supply differential pressure. In an exemplary embodiment, the width of the second annular gap may be adjustable.

In one example embodiment, an axial hole may be drilled through the minor element 106, allowing water to be directly discharged through an orifice formed at a face of the minor element 106. This configuration provides a third pathway for fluid to pass through (sprayed into). In one embodiment, fluid may be sprayed into ambient steam. The axial hole may serve as a fixed geometry nozzle which may be sized based on a desired droplet size and flow rate for a given supply differential pressure range.

Figure 2:
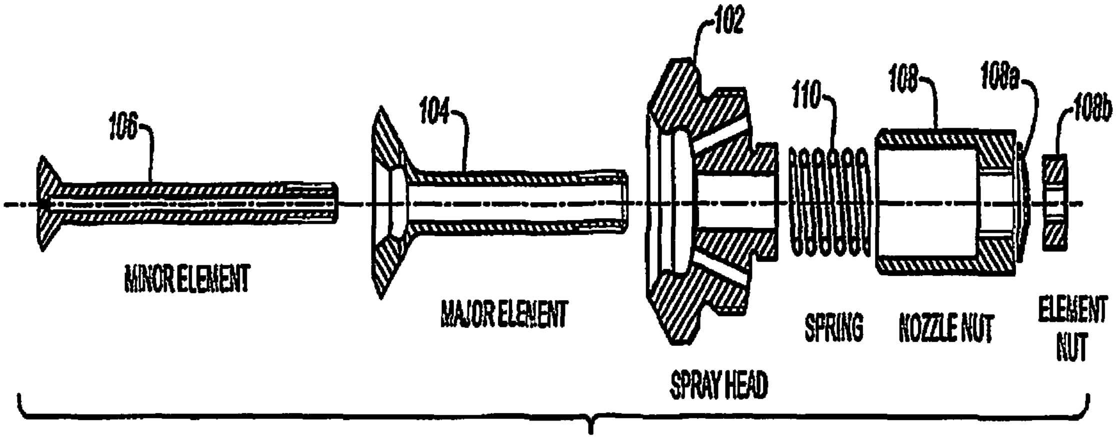
FIG. 2 is a perspective view of the specific components of the spray nozzle apparatus of FIG. 1, according to an example embodiment.

FIG. 2 is a perspective view of the specific components of the Triple Nozzle apparatus 100 of FIG. 1, according to an example embodiment. FIG. 2 shows the individual components of the Triple Nozzle apparatus 100 including: a sprayhead 102, a major element 104, a minor element 106, a nozzle nut 108 (including a spring **108*a* as well as an element nut 108*b*), and a spring 110. Please refer to the detailed description of FIG. 1 for a more detailed explanation of each of the individual components of the Triple Nozzle apparatus 100**.

An Exemplary Method

In this section, an exemplary method of using the Triple Nozzle is described by reference to a flow chart.

Figure 3:
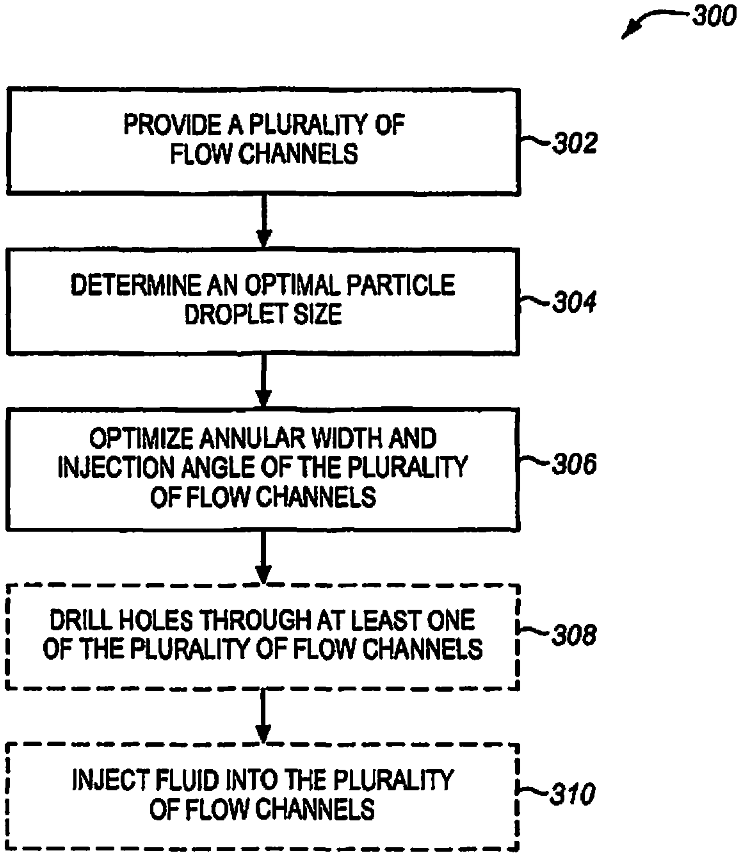
FIG. 3 is a block diagram illustrating a method to optimize fluid flow, according to an example embodiment.
Figure 4:
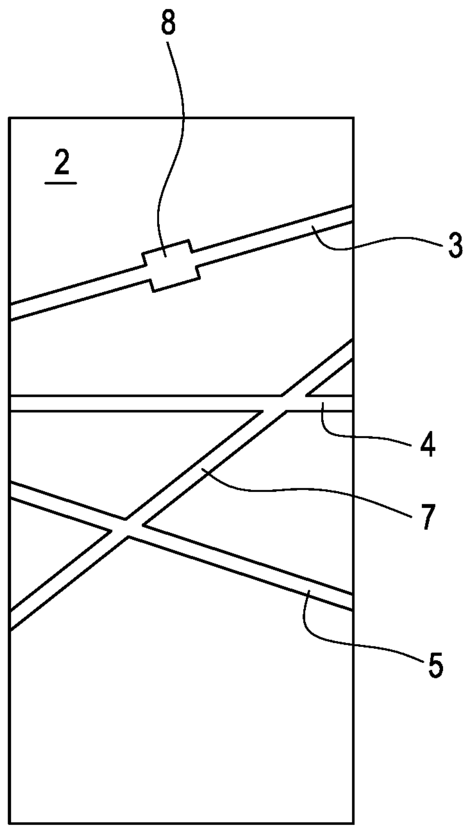
FIG. 4 is a schematic illustration showing three flow channels and a drilled hole or passageway.

FIG. 3 is a block diagram illustrating a method to optimize fluid flow, according to an example embodiment. The method 300 may be implemented by providing a plurality of flow channels (block 302), determining an optimal particle droplet size (block 304), and optimizing annular width and injection angle for each of the plurality of flow channels (block 306).

A plurality of flow channels are provided at block 302. In one exemplary embodiment, the plurality of flow channels may be the three flow channels of the Triple Nozzle apparatus 100 described in FIG. 1. In another embodiment, the plurality of flow channels may be any apparatus used to control fluid (including a nozzle). Fluid may be any substance that has no fixed shape and yields easily to external pressure. Example embodiments of fluid may include a gas (including steam) and liquid. In an exemplary embodiment, multiple fluids may pass through the plurality of flow channels. In one example embodiment, the fluid may be water. The plurality of flow channels may control the direction and characteristics of fluid flow. Some characteristics of fluid flow which may be controlled by the plurality of flow channels include, but are not limited to: rate of flow, direction, mass, shape, and/or pressure of the stream, among others.

More specifically, the plurality of flow channels may control a spray pattern and particle distribution of a fluid. Each channel of the plurality of flow channels may offer different ranges of spray flow rates as well as supply varying differential pressures. The spray flow rates and differential pressures applied by each of the plurality of flow channels may be variable depending on the fluid passing through the flow channels. In an example embodiment, the fluid in at least one of the plurality of flow channels may be steam. Steam may be generated by controlling the temperature of the fluid passing through the plurality of flow channels. In one embodiment, steam may be transformed from liquid fluid such as water by increasing temperature. In another embodiment, subcooled water at controlled room temperature and flow rate may be injected into flowing superheated steam to generate a desired equilibrium steam temperature.

At block 304, an optimal particle droplet size is determined. The optimal particle droplet size may vary depending on the type of fluid running through the plurality of flow channels and the desired application of the fluid. As previously mentioned, particle droplet size is a key parameter in effectiveness of heat transfer between superheated steam to be conditioned and subcooled liquid spray. A field of smaller droplets will have considerably more interfacial surface area for heat transfer than will the same mass when distributed in larger drop diameters. Determining an optimal particle droplet size may be accomplished by any measurement analysis, mathematical function, or machine or apparatus. Determining an optimal particle droplet size may also occur by trial and error from adjusting a nozzle apparatus such as the Triple Nozzle 100 apparatus described in FIG. 1.

At block 306, annular width and injection angle for each of the plurality of fluid channels is optimized. The annular width and injection angle may be optimized (block 306) for each of the plurality of fluid channels to obtain the optimal particle droplet size during fluid distribution. More specifically, the plurality of flow channels may be optimized (block 306) for particle size and spatial distribution of the optimal droplet size (determined at block 304). The plurality of flow channels may be variable allowing adjustment of each of the flow channels. In one embodiment, optimizing the plurality of fluid channels may include adjusting the annular width and injection angle for each of the plurality of flow channels. This may allow a nozzle apparatus such as the Triple Nozzle 100 apparatus described in FIG. 1 to be used for different applications. This may also produce better distribution of droplet placement in the flow stream over a wide range of flow rates.

An alternative embodiment to the method 300 further comprises drilling holes through at least one of the plurality of flow channels (block 308). Drilling holes (block 308) may allow fluid to enter flow channels of a nozzle apparatus such as the Triple Nozzle 100 apparatus described in FIG. 1. In one embodiment, drilling (block 308) holes in at least one of the plurality of flow channels may allow fluid to enter other flow channels. In an exemplary embodiment, holes may be drilled into at least one of the plurality of flow channels at an angle to impart swirl onto fluid before exiting the flow channel.

Yet another alternative embodiment of the method 300 further comprises injecting fluid into the plurality of flow channels (block 310). In one embodiment, the injected fluid may be temperature controlled.

Conclusion

This has been a detailed description of some exemplary embodiments of the present disclosure contained within the disclosed subject matter. The detailed description refers to the accompanying drawings that form a part hereof and which show by way of illustration, but not of limitation, some specific embodiments of the present disclosure, including a preferred embodiment. These embodiments are described in sufficient detail to enable those of ordinary skill in the art to understand and implement the present disclosure. Other embodiments may be utilized and changes may be made without departing from the scope of the present disclosure. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, the present disclosure lies in less than all features of a single disclosed embodiment. Thus, the following claims are hereby incorporated into the Detailed Description, with each claim standing on its own as a separate preferred embodiment. It will be readily understood to those skilled in the art that various other changes in the details, material, and arrangements of the parts and method stages which have been described and illustrated in order to explain the nature of this disclosure may be made without departing from the principles and scope as expressed in the subjoined claims.

It is emphasized that the Abstract is provided to comply with requirements for an Abstract that will allow the reader to quickly ascertain the nature and gist of the technical disclosure. It is submitted with the understanding that it will not be used to interpret or limit the scope or meaning of the claims.

The invention claimed is:

1. A method for optimizing fluid flows comprising:

providing a triple nozzle block assembly including a spray head, a major element retained within said spray head and a minor element retained within said major element and said triple block assembly further including three flow channels that are optimized for particle size and spatial distribution;

adjusting the relative positioning of said spray head, said major element, and said minor element to optimize said triple nozzle block assembly with an injection angle for each of the plurality of flow channels to obtain the optimal particle droplet size during fluid distribution; and further comprising injecting a fluid into the plurality of flow channels.

2. The method of optimizing fluid flow according to claim 1, wherein optimizing further comprises sizing the annular width and injection angle of at least one of the plurality of flow channels to match conditions in steam flow.

3. The method of optimizing fluid flow according to claim 1, wherein the fluid is water.

4. The method of optimizing fluid flow according to claim 1, wherein steam is generated by injecting water at room temperature into flowing superheated steam to generate a desired equilibrium temperature.

5. The method of optimizing fluid flow according to claim 1, wherein said fluid is water which is transformed from liquid fluid to gas by an increase in temperature.

* * * * *